Patented Apr. 26, 1932

1,855,230

UNITED STATES PATENT OFFICE

HAROLD C. GOOD, OF NEW YORK, N. Y., ASSIGNOR TO BENNETT DAY IMPORTING COMPANY, INC., OF NEW YORK, N. Y., A CORPORATION OF NEW YORK

PROCESS FOR TREATING EDIBLE NUTS

No Drawing. Application filed July 13, 1928, Serial No. 292,594. Renewed May 23, 1930.

This invention relates to the treatment of edible nuts and has for an object the provision of an improved process for improving the physical appearance of edible nuts in the shell. The invention further contemplates the production of improved edible nut products which will be attractive to the eye and suggestive of the true nutritive values and flavors of their meats.

Edible nuts, as received from their gathering places, are rather unattractive either because of their natural coloring, or by virtue of the fact that they are muddy and mildewed. Usually, their physical appearances must be altered in such a manner as to make them more attractive to the eye and less suggestive of uncleanliness before they can be sold to the public.

Many processes have been suggested and used for preparing nuts for marketing. In most cases, the nuts are at least washed for the purpose of removing some part or all of the mud and mildew or other discoloring matter. The washed nuts may be then dried and polished or otherwise treated for the purpose of further improving their appearances. In many instances, the washed nuts are bleached for the purpose of providing a bright shell of uniform color. However, all nuts are not amenable to the customary bleaching processes. Walnuts and almonds are particularly amenable to bleaching processes and these nuts as found on the market have bright shells of uniform color, and for this reason they are particularly appealing to purchasers of nuts. On the other hand, other types of nuts are not particularly amenable to bleaching processes, and, consequently these nuts as at present found on the market, are unattractive and may have dirty, unsanitary appearances suggestive of uncleanliness. This condition militates against their sale. These nuts suffer particularly by way of contrast with the bright shelled, uniformly colored walnuts and almonds which may be obtained.

I have discovered that by properly subjecting certain types of nuts in the shell to the action of coloring substances, such as organic dyes, nut products having attractive, bright, uniformly colored shells may be produced. I have also found that the impregnation of the shells of these nuts with coloring substances results in the production of products the pores of which are substantially sealed and which, consequently, have a tendency to retain their oil. The nut products of my process, as distinguished from the natural or untreated products, feel dry to the touch, and the deterioration which is normal to the natural or untreated product is substantially retarded.

Nuts which I have found to be particularly amenable to the dyeing treatment are Brazil nuts, pecans, and filberts. The appearances of these nuts cannot be satisfactorily improved by the heretofore customary methods of treatment, that is, they cannot be sufficiently improved so that their appearances compare favorably with the appearances of walnuts and almonds. According to some present practices, Brazil nuts are marketed in their natural condition, or after having been washed for the purpose of removing mud and mildew; pecans are polished by dry or wet tumbling; and filberts are marketed after having been washed and dried.

The ordinary Brazil nut of commerce has a dirty brownish black shell, and is one of the most unattractive of the nuts on the market. However, by treating these nuts according to my improved process, nut products having attractive, bright, uniformly colored shells, and which compare favorably in appearance, with bleached walnuts and almonds, may be produced. Brazil nuts after having been subjected to my preferred method of treatment have an attractive, uniform, bright, light brown color, that substantially simulates the native color of these nuts.

The dyes which I have found to be most satisfactory in effecting the desired changes in the appearances of nuts are naphthol yellow S, and orange I. The most desirable color shades are produced when mixtures of these two dyes are used.

According to the process of my invention, the nuts to be treated are immersed in a relatively dilute solution of a suitable dye for a sufficient length of time to effect a slight impregnation of the dye solution into the outer surface portions of the shells. The time required varies according to the extent of impregnation desired, the temperature of the dye bath, and the dyes used. I have obtained highly satisfactory results by exposing nuts to the action of a cold aqueous solution of dye, containing about 1/8% to 1/4% by weight of dye, for a period of from one to one and one-half minutes. Water at ordinary atmospheric temperatures may be used satisfactorily in making up the dye solutions.

After the nuts have been exposed to the action of the dye solution for a suitable length of time, they are removed from the bath and dried. Drying may be ordinarily accomplished by circulating a current of air in contact with the nuts contained in suitable bins or receptacles.

The following examples illustrate some of the bath compositions which I have found to produce satisfactory results when the nuts are immersed for from one to one and one-half minutes at normal atmospheric temperatures.

Brazil nuts:
I Naphthol yellow S _____ 0.50 pounds
   Orange I _____ 1.50 pounds
   Water _____ 100.00 gallons
II Naphthol yellow S _____ 1.78 pounds
   Orange I _____ 0.22 pounds
   Water _____ 100.00 gallons Pecans:
   Naphthol yellow S _____ 0.375 pounds
   Orange I _____ 1.125 pounds
   Water _____ 100.00 gallons Filberts:
   Naphthol yellow S _____ 0.25 pounds
   Orange I _____ 1.25 pounds
   Water _____ 100.00 gallons Nuts treated in baths of the type described above dry rapidly. The colors are fast and uniform, and the nut products are bright and attractive.

The colors of the resulting products may be varied by varying the type and proportions of the dyes used, and the conditions under which the impregnation is carried out.

I claim:

1. The method of improving the appearance of Brazil, pecan, filbert and like edible nuts in the shell, which comprises impregnating the shell with a solution containing naphthol yellow S and orange I to substantially uniformly color the surface thereof.

2. The method of improving the appearance of Brazil, pecan, filbert and like edible nuts in the shell, which comprises subjecting the shell to the action of a cold aqueous solution containing naphthol yellow S and orange I for a period of about one to one and one-half minutes to substantially uniformly color the surface thereof.

3. The method of treating Brazil nuts which comprises immersing the nuts in a bath containing naphthol yellow S and orange I, and subsequently drying the nuts.

4. The method of treating Brazil nuts, pecans and filberts in the shell which comprises impregnating the shells with a dye solution and then drying them to effect at least a partial sealing of the pores of the shells whereby deterioration of the nuts is retarded, and to impart a substantially uniform surface color to the nuts.

5. The method of treating Brazil nuts in the shell which comprises impregnating the shells with a suitably colored dye solution and then drying them to effect at least a partial sealing of the pores of the shells whereby deterioration of the nuts is retarded, and to impart to the shells a uniform surface color that resembles their native color.

In testimony whereof I affix my signature.

HAROLD C. GOOD.